US008407404B2

United States Patent
Callen

(10) Patent No.: US 8,407,404 B2
(45) Date of Patent: Mar. 26, 2013

(54) RECORD SORTING

(75) Inventor: Jerry Lee Callen, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 12/650,991

(22) Filed: Dec. 31, 2009

(65) Prior Publication Data

US 2011/0161558 A1    Jun. 30, 2011

(51) Int. Cl.
*G06F 12/00* (2006.01)
(52) U.S. Cl. .................. 711/103; 711/E12.008
(58) Field of Classification Search .............. None
See application file for complete search history.

(56) References Cited

U.S. PATENT DOCUMENTS

| 5,117,495 | A | 5/1992 | Liu |
| 7,454,420 | B2 | 11/2008 | Ray et al. |
| 7,496,572 | B2 | 2/2009 | Blaicher |
| 2004/0225874 | A1* | 11/2004 | Burr et al. ............ 713/1 |
| 2011/0072430 | A1* | 3/2011 | Mani ................. 718/1 |
| 2011/0093648 | A1* | 4/2011 | Belluomini et al. ....... 711/103 |
| 2011/0252184 | A1* | 10/2011 | Cho et al. ........... 711/102 |

OTHER PUBLICATIONS

Knuth, Donald, The Art of Computer Programming, vol. 3, Sorting and Searching, pp. 371-378, 1973.*

* cited by examiner

*Primary Examiner* — Edward Dudek, Jr.
*Assistant Examiner* — John P Fishburn
(74) *Attorney, Agent, or Firm* — Holland & Knight LLP; Brian J. Colandreo, Esq.; Rory E. Foster, Esq.

(57) ABSTRACT

A method, computer program product, and computing system for record sorting is described. The method may comprise splitting an incoming record into a separate key block and payload block. The method may further comprise storing the key block in a first memory. The method may also comprise assigning the payload block an address in a second memory at the beginning of a sort. Moreover, the method may store, with the key block in the first memory, the address of the payload block in the second memory. Additionally, the method may store the payload block at the address in the second memory.

12 Claims, 4 Drawing Sheets

RECORD SORTING

BACKGROUND OF THE INVENTION

This disclosure relates to record sorting and, more particularly, to exploiting secondary memory while sorting.

Secondary memory may typically be used for intermediate runs while sorting. Keys and payloads of incoming records may typically be stored together, in the same block. When stored together, the keys and payloads may not fit into the available main memory, and secondary memory, which may be slower, may be used during sorting. Accordingly, there may be a need to reduce the amount of main memory taken by payloads while sorting.

BRIEF SUMMARY OF THE INVENTION

In a first embodiment, a method may comprise splitting an incoming record into a separate key block and payload block. The method may further comprise storing the key block in a first memory. The method may also comprise assigning the payload block an address in a second memory at the beginning of a sort. Furthermore, the method may comprise storing, with the key block in the first memory, the address of the payload block in the second memory. Moreover, the method may comprise storing the payload block at the address in the second memory.

One or more of the following features may be included. In some implementations, the first memory may be a main memory. Also, the second memory may be a flash memory. The method may retrieve the payload block from the flash memory after a final merge. Further, the method may rejoin the payload block with the key block. The main memory and the flash memory may be components of at least one of an information server, a blade server, and a rack-mount device. Moreover, storing the payload block at the address in the flash memory may overlap reading and initial sorting of a next incoming record. Additionally, the flash memory may be at least one of a NOR flash memory and a NAND flash memory.

In a second embodiment, a computer program product may reside on a computer readable storage medium and may have a plurality of instructions stored on it. When executed by a processor, the instructions may cause the processor to perform operations comprising splitting an incoming record into a separate key block and payload block. The operations may further comprise storing the key block in a first memory. The operations may also comprise assigning the payload block an address in a second memory at the beginning of a sort. Furthermore, the operations may comprise storing, with the key block in the first memory, the address of the payload block in the second memory. Additionally, the operations may comprise storing the payload block at the address in the second memory.

One or more of the following features may be included. In some implementations, the first memory may be a main memory. Also, the second memory may be a flash memory. The operations may further comprise retrieving the payload block from the flash memory after a final merge. Further, the operations may comprise rejoining the payload block with the key block. The main memory and the flash memory may be components of at least one of an information server, a blade server, and a rack-mount device. Storing the payload block at the address in the flash memory may overlap reading and initial sorting of a next incoming record. Additionally, the flash memory may be at least one of a NOR flash memory and a NAND flash memory.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to split an incoming record into a separate key block and payload block. Further, the computing system may include a second software module configured to store the key block in a first memory. A third software module may be configured to assign the payload block an address in a second memory at the beginning of a sort. A fourth software module may be configured to store, with the key block in the first memory, the address of the payload block in the second memory. Additionally, a fifth software module may be configured to store the payload block at the address in the second memory.

One or more of the following features may be included. In some implementations, the first memory may be a main memory. Also, the second memory may be a flash memory. A sixth software module may be configured to retrieve the payload block from the flash memory after a final merge.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings denote like elements.

DETAILED DESCRIPTION OF THE INVENTION

Figure 1:
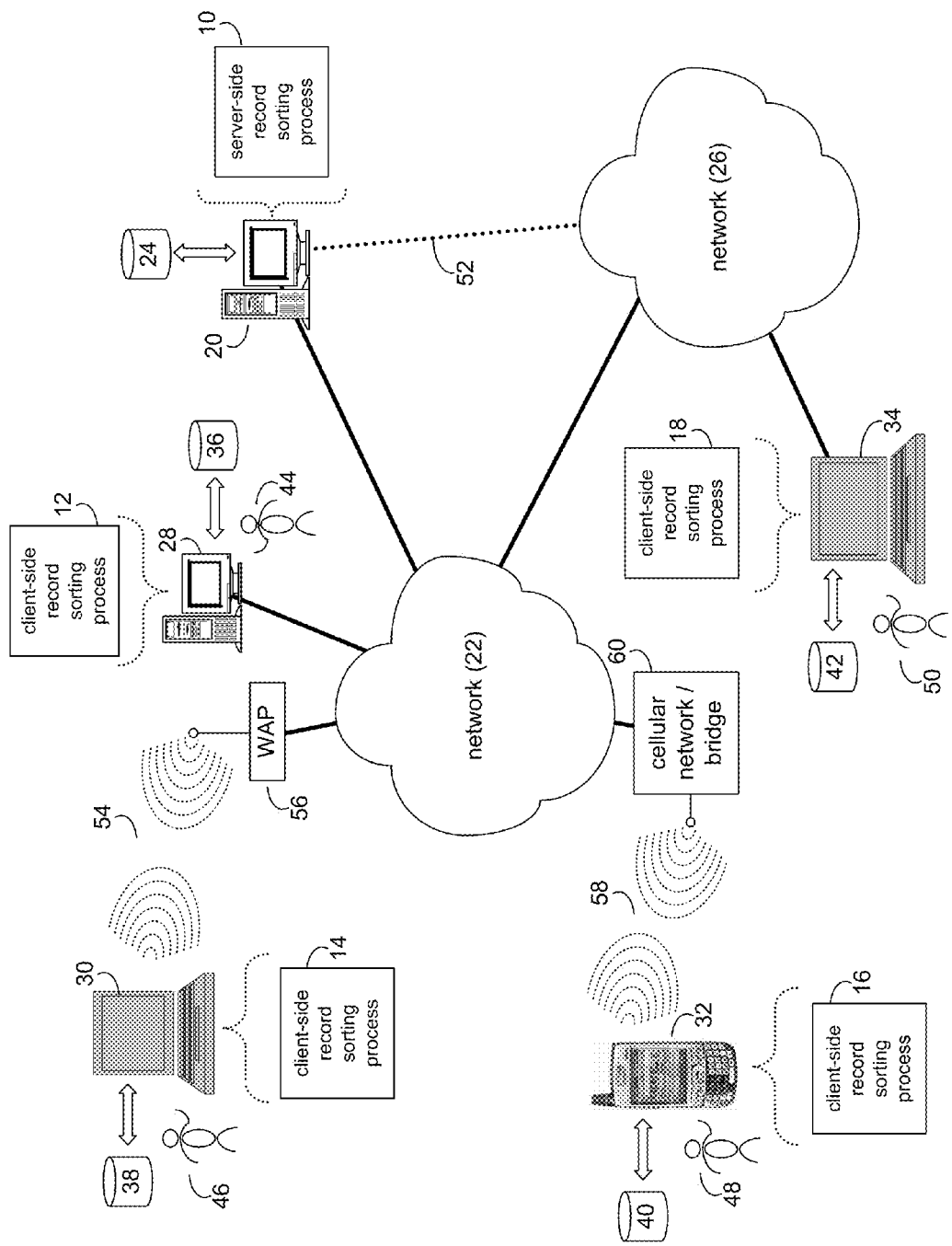
FIG. 1 is a diagrammatic view of a record sorting process coupled to a distributed computing network.
Figure 2:
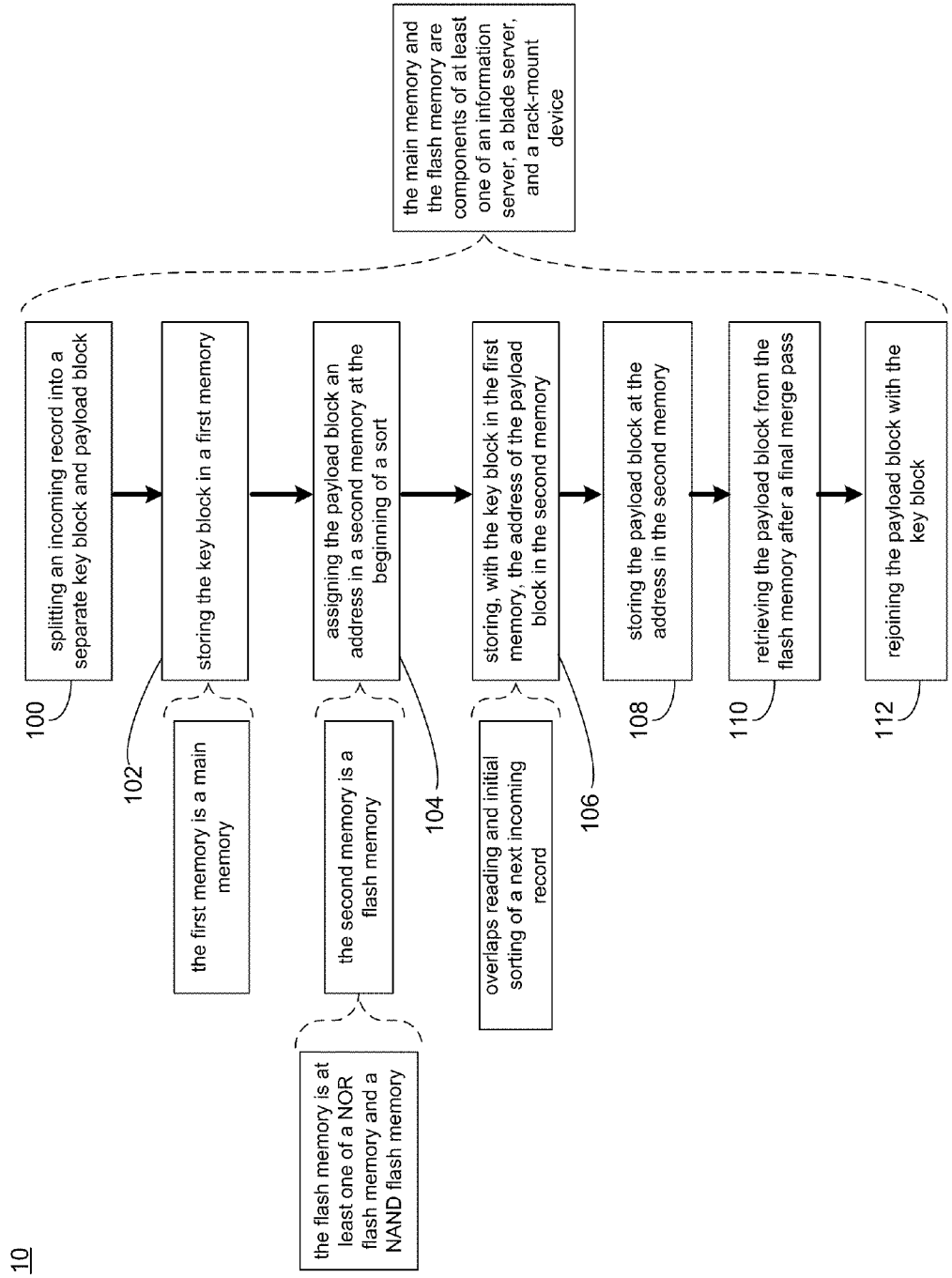
FIG. 2 is a flowchart of the record sorting process of FIG. 1.

Referring to FIGS. 1 & 2, there is shown a record sorting process 10. As will be discussed below, record sorting process 10 may split 100, an incoming record into a separate key block and payload block. Record sorting process 10 may also store 102 the key block in a first memory.

The record sorting (RS) process may be a server-side process (e.g., server-side RS process 10), a client-side process (e.g., client-side RS process 12, client-side RS process 14, client-side RS process 16, or client-side RS process 18), or a hybrid server-side/client-side process (e.g., the combination of server-side RS process 10 and one or more of client-side RS processes 12, 14, 16, 18).

Server-side RS process 10 may reside on and may be executed by server computer 20, which may be connected to network 22 (e.g., the Internet or a local area network). Examples of server computer 20 may include, but are not limited to: a personal computer, a server computer, a series of server computers, a mini computer, a mainframe computer and/or a computing device as described below. Server computer 20 may be a web server (or a series of servers) running a network operating system, examples of which may include but are not limited to: Microsoft Windows XP Server™; Novell Netware™; or Redhat Linux™, for example.

The instruction sets and subroutines of server-side RS process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); a read-only memory (ROM); and a flash memory.

Server computer 20 may execute a web server application, examples of which may include but are not limited to: Microsoft IIS™, Novell Webserver™, or Apache Webserver™, that allows for access to server computer 20 (via network 22) using one or more protocols, examples of which may include but are not limited to HTTP (i.e., HyperText Transfer Protocol), SIP (i.e., session initiation protocol), and the Lotus Sametime™ VP protocol. Network 22 may be connected to one or more secondary networks (e.g., network 26), examples of which may include but are not limited to: a local area network; a wide area network; or an intranet, for example.

Client-side RS processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows™, Microsoft Windows CE™, Redhat Linux™, or a custom operating system.

The instruction sets and subroutines of client-side RS processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side RS processes 12, 14, 16, 18 and/or server-side RS process 10 may be processes that run within (i.e., are part of) an operating system such as those mentioned above. Alternatively, client-side RS processes 12, 14, 16, 18 and/or server-side RS process 10 may be stand-alone applications that may work in conjunction with other installed programs or applications. One or more of client-side RS processes 12, 14, 16, 18 and server-side RS process 10 may interface with each other (via network 22 and/or network 26).

Users 44, 46, 48, 50 may access server-side RS process 10 directly through the device on which the client-side RS process (e.g., client-side RS processes 12, 14, 16, 18) is executed, namely client electronic devices 28, 30, 32, 34, for example. Users 44, 46, 48, 50 may access server-side RS process 10 directly through network 22 and/or through secondary network 26. Further, server computer 20 (i.e., the computer that executes server-side RS process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Record Sorting Process

Figure 3:
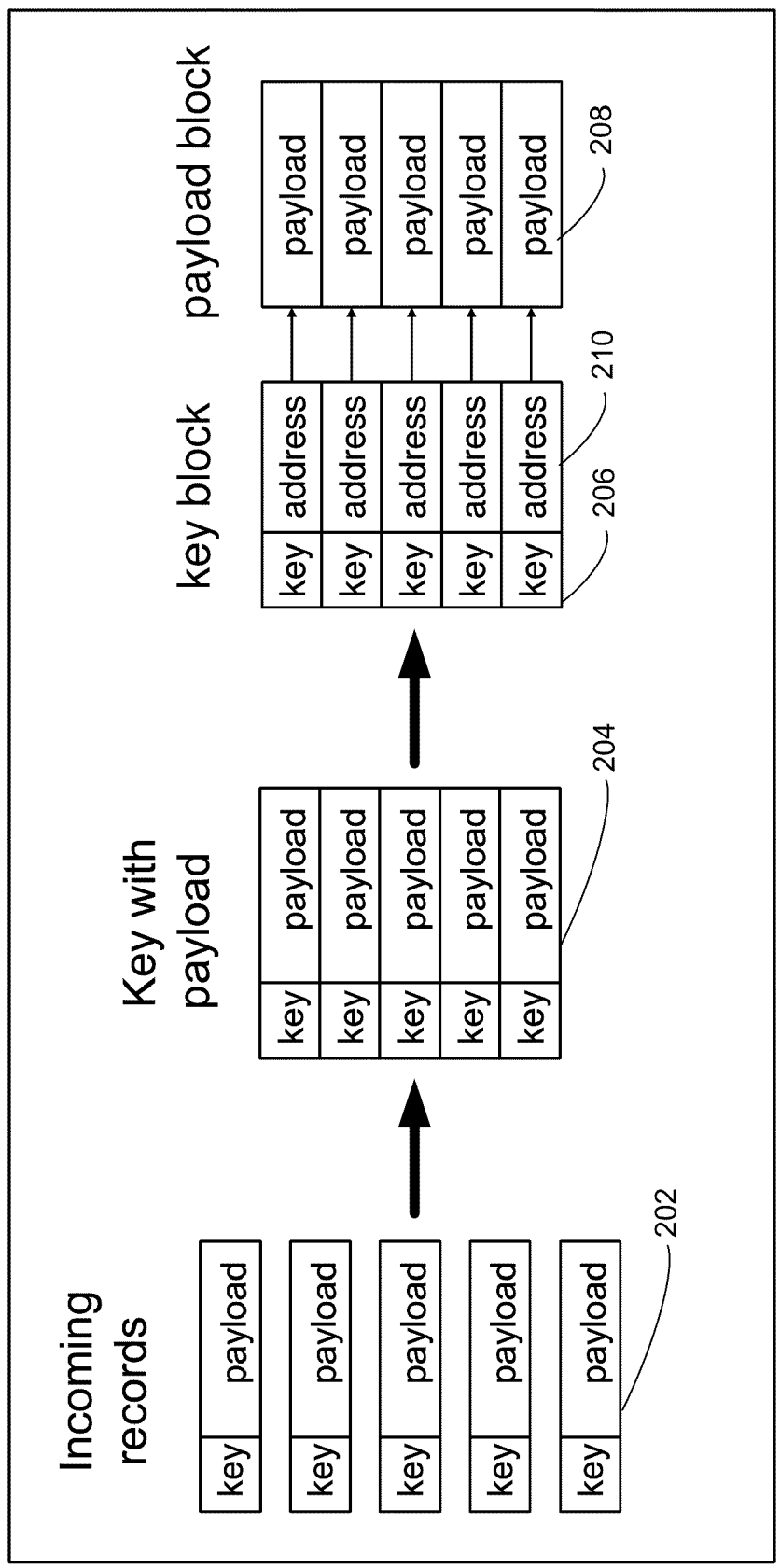
FIG. 3 is a diagrammatic flowchart of a portion of the record sorting process.
Figure 4:
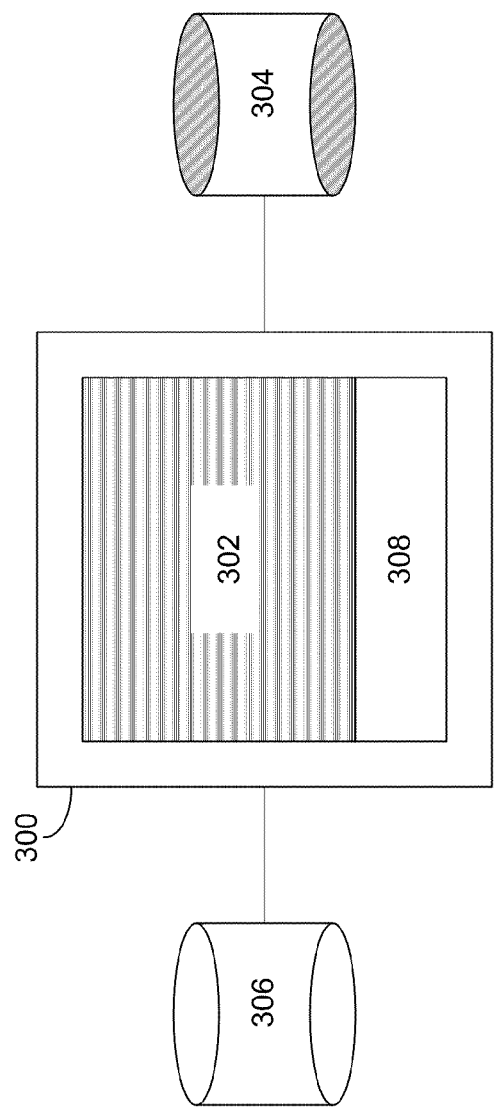
FIG. 4 is a computing device which may execute the record sorting process.

Referring now to FIGS. 3 & 4, a sort (e.g., sorting process 10) may be a process that arranges a set of records (e.g., incoming record 202) in a sequence based upon, at least in part, a key (e.g., key 206). Sorting process 10 may be an internal sort and/or an external sort. An internal sort may be used when the entire set of records fits into the main memory (e.g., first memory 302) within e.g., server computer 20. If the entire set of records does not fit into the main memory, an external sort may be used. The external sort may use a second memory (e.g., second memory 304) which may be a temporary memory. External sorts may divide incoming records into separate runs, each of which may fit into the main memory (e.g., first memory 302) within e.g., server computer 20. Each run may be sorted independently, and the external sort may produce a set of ordered runs. These ordered runs may be referred to as intermediate runs, and may be stored in a second memory (e.g., second memory 304) within e.g., server computer 20.

An external sort may have multiple phases. For example, in a three-phase external sort, the first phase may include reading as many incoming records as will fit into a main memory (e.g., storage device), and sorting the incoming records. The sorted incoming records (e.g., a sorted run) may be written to a second memory (e.g., storage device). The second phase may include intermediate merges, which may merge the sorted runs into fewer, longer runs while there are more sorted runs remaining than can be merged at once. This phase may be executed multiple times until all the sorted runs are merged. The third phase may include a final merge, where final runs are merged and a final output set is produced.

Further, key and payload portions of incoming record 202 may be kept together in the same block (e.g., block 204). This is because the payload may be required when the final output set is produced, and separating the key from the payload may require random access to disk storage, which may be slower than sequential access. Keeping the key and payload together, for example, may reduce the number of keys that may be kept in the main memory (e.g., first memory 302) because the payloads may occupy space in the main memory that could be used for keys. Further, the number of merges that must be made to produce the final output set may be increased. However, as shown in FIG. 3 and as will be discussed below, key 206 and payload 208, for example, may be separated during intermediate runs, which may allow more keys to be kept in the main memory (e.g., first memory 302), reduce the number of merges required to produce the final output set, and produce longer runs.

Server-side RS process 10 (a sorting process) will be discussed below for exemplary purposes; however the discussion below may be equally applicable to any of the client-side RS processes (e.g., client-side RS process 12, 14, 16, 18). Referring now to FIGS. 1-4, RS process 10 may split 100 an incoming record (e.g., incoming record 202) into a separate key block (e.g., key/key block 206) and payload block 208 (e.g., payload/payload block 208). Incoming record 202 may be a row within a database (e.g., a tuple) such as a relational database. Incoming record 202 may represent any information that may be stored in a database, including but not limited to names, addresses, account numbers, telephone numbers, license plate numbers, healthcare data and/or employee data. Further, each incoming record may include a key (e.g., key 206) and a payload (e.g., payload 208). Key 206 may be associated with payload 208 in order to identify the payload. For example, key 206 may include a small portion of incoming record 202, and the rest of the record may be referred to as the payload (e.g., payload 208). Key 206 may also be an attribute of incoming record 202.

RS process 10 may store 102 key block 206 in first memory 302. First memory 302 may be a main memory, and may be any of the storage devices discussed above. In one implementation, first memory 302 may be any type of random access memory (RAM) including but not limited to dynamic random access memory (DRAM), Rambus DRAM (RDRAM), synchronous DRAM (SDRAM), extreme data rate DRAM (XDR DRAM), and/or dynamic data rate SDRAM (DDR SDRAM).

Continuing with the example above, RS process 10 may assign 104 payload block 208 address 210 in second memory 304 at the beginning of a sort and/or sorting process (e.g., RS processes 10 and/or 12, 14, 16, 18). Second memory 304 may be any of the storage devices discussed above, including but not limited to flash memory. Additionally, second memory 304 may be a "storage class memory". Storage class memories may be cheaper than the computer's main memory and may include one or more of the following features. Storage class memories may have slower access times than main memory, and in particular, slower write access times. Further, storage class memories may have uniform access times. In contrast, the time to access a block of memory in disk storage may be dependent upon seek time and rotational delay. Storage class memories may also have asymmetric read and write access times. In particular, while writing to storage class memories may be relatively slow compared to main memory, reading from storage class memories may be nearly as fast as read access to main memory. The combination of these characteristics may allow successful separation of keys and payloads.

Flash memory may be a non-volatile storage device that may be electronically erased and reprogrammed or may be an electronically erasable programmable read-only memory (EEPROM) that may be erased and programmed in large blocks. Further flash memory may not require power to maintain information stored thereon, and may offer fast read access times. The flash memory may be at least one of, but is not limited to, NOR flash memory and/or NAND flash memory. While flash memory may have a write time larger than its read time, and a limited lifetime, the read access time of each storage block in flash memory may be uniform and small. For illustrative purposes only, second memory 304 will be discussed below as being flash memory, however other configurations are possible.

As shown in FIG. 3, RS process 10 may further store 106, with key block 206 in first memory 302, the address (e.g., address 210) of the payload block (e.g., payload 208) in second memory 304 (e.g., flash memory). As such, address 210 of payload block 208 in second memory 304 may be kept with key block 206 in first memory 302, instead of with the actual payload. Additionally, RS process 10 may store 108 payload block 208 at address 210 in second memory 304 (e.g., flash memory). After a final merge, RS process 10 may retrieve 110 payload block 208 from second memory 304 (e.g., flash memory) and may rejoin 112 payload block 208 with key block 206. Payload block 208 may be retrieved in constant time from the flash memory, as the read access time of each storage block in flash memory may be constant and small. After a final merge, a final output set may be stored in a third memory (e.g., permanent memory 306), which may be any of the storage devices discussed above.

Consequently, RS process 10 may allow more keys to fit in a given amount of main memory by (i) splitting keys and payloads apart, (ii) storing each key with the flash memory address of its respective payload, and (iii) storing each payload in the flash memory. More keys may fit in a given amount of main memory because key/address blocks (e.g., combined key block 206 and address block 210) may be smaller than key/payload blocks (e.g., combined key/payload block 204). As such, less main memory and more flash memory may be used to sort the same number of records, and costs may decline since flash memory may be cheaper than main memory. RS process 10 may also reduce the number of merges required to produce an ordered set of keys. As flash memory may have a limited lifetime, each payload block may be written and retrieved only once during the sorting process. Since the payload may only be written once, and read once during the final merge, there may be less input/output traffic. Further, since payload blocks may be written during an initial incoming record reading phase, storing payload block 208 at address 210 in the flash memory may overlap the reading and initial sorting of the next incoming record.

It should be noted that keys, with their associated payload addresses in secondary memory, may be sorted internally. In some cases, storing the payload on secondary memory may leave sufficient main memory available for the entire key sort to be done internally. In other cases, it may still be necessary to use secondary memory and intermediate merges for key blocks. However, as noted above, the separation of the keys and payloads may result in less input/output traffic.

In some implementations, the main memory (e.g. first memory 302) and the flash memory (e.g., second memory 304) may be components of, or may otherwise be in communication with, a computing device such as an information server, a blade server, and/or a rack-mount device. The computing device may be, for example, any one of server computer 20 and/or client electronic devices 28, 30, 32, and/or 34. Further, the computing device may be computing device 300 as shown in FIG. 4 and may include first memory 302, second memory 304, permanent memory 306, and processor 308, which may run RS process 10. The computing device may include a Cell™ architecture as jointly developed by Sony Computer Entertainment, Toshiba, and IBM Corporation of Armonk, N.Y., and/or a z/architecture such as the zSeries mainframe computers developed by IBM Corporation of Armonk, N.Y., and may be used as a dedicated sort accelerator. The computing device may include two or more processors instead of a single processor 308. Further, the computing device may include one or more buffers, which may be regions of memory or additional memories and may temporarily hold payload data waiting to be written to the flash memory. The one or more buffers may mask a slow write speed of flash memory.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
splitting an incoming record into a key block and a payload block, wherein the key block is separate from the payload block;
storing the key block in a first memory;
assigning the payload block an address in a second memory at the beginning of a sort;
storing, with the key block in the first memory, the address of the payload block in the second memory;
storing the payload block at the address in the second memory;
retrieving the payload block from the second memory after a final merge; and
rejoining the payload block with the key block,
wherein the first memory is a main memory, and the second memory is a flash memory.

2. The method of claim 1 wherein the main memory and the flash memory are components of at least one of an information server, a blade server, and a rack-mount device.

3. The method of claim 1 wherein storing the payload block at the address in the flash memory overlaps reading and initial sorting of a next incoming record.

4. The method of claim 1 wherein the flash memory is at least one of a NOR flash memory and a NAND flash memory.

5. The method of claim 1 wherein the key block includes, at least in part, one or more of a portion of the incoming record and an attribute of the incoming record.

6. A computer program product residing on a non-transitory computer readable storage medium having a plurality of instructions stored thereon, which, when executed by a processor, cause the processor to perform operations comprising:
splitting an incoming record into a key block and a payload block, wherein the key block is separate from the payload block;
storing the key block in a first memory;
assigning the payload block an address in a second memory at the beginning of a sort;
storing, with the key block in the first memory, the address of the payload block in the second memory;
storing the payload block at the address in the second memory;
retrieving the payload block from the second memory after a final merge;
and rejoining the payload block with the key block,
wherein the first memory is a main memory, and the second memory is a flash memory.

7. The computer program product of claim 6 wherein the main memory and the flash memory are components of at least one of an information server, a blade server, and a rack-mount device.

8. The computer program product of claim 6 wherein storing the payload block at the address in the flash memory overlaps reading and initial sorting of a next incoming record.

9. The computer program product of claim 6 wherein the flash memory is at least one of a NOR flash memory and a NAND flash memory.

10. The computer program product of claim 6 wherein the key block includes, at least in part, one or more of a portion of the incoming record and an attribute of the incoming record.

11. A computing system comprising:
at least one processor;
at least one memory architecture coupled with the at least one processor;
a first software module executed on the at least one processor and the at least one memory architecture, wherein the first software module is configured to split an incoming record into a separate key block and a payload block, wherein the key block is separate from the payload block;
a second software module executed on the at least one processor and the at least one memory architecture, wherein the second software module is configured to store the key block in a first memory;
a third software module executed on the at least one processor and the at least one memory architecture, wherein the third software module is configured to assign the payload block an address in a second memory at the beginning of a sort;
a fourth software module executed on the at least one processor and the at least one memory architecture, wherein the fourth software module is configured to store, with the key block in the first memory, the address of the payload block in the second memory;
a fifth software module executed on the at least one processor and the at least one memory architecture, wherein the fifth software module is configured to store the payload block at the address in the second memory;
a sixth software module executed on the at least one processor and the at least one memory architecture, wherein the sixth software module is configured to retrieve the payload block from the second memory after a final merge; and
a seventh software module executed on the at least one processor and the at least one memory architecture, wherein the seventh software module is configured to rejoin the payload block with the key block,
wherein the first memory is a main memory, and the second memory is a flash memory.

12. The computing system of claim 11 wherein the key block includes, at least in part, one or more of a portion of the incoming record and an attribute of the incoming record.

* * * * *